US008909913B2

(12) United States Patent
Liu

(10) Patent No.: US 8,909,913 B2
(45) Date of Patent: Dec. 9, 2014

(54) METHOD FOR INTEGRATING HETEROGENEOUS OPERATING SYSTEMS BASED ON THE SAME SYSTEM KERNEL USING A SHARED INFORMATION AREA ACCESSIBLE TO MULTIPLE OPERATING SYSTEMS

(75) Inventor: Wei-Hung Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 310 days.

(21) Appl. No.: 13/197,753

(22) Filed: Aug. 3, 2011

(65) Prior Publication Data

US 2012/0042159 A1  Feb. 16, 2012

(30) Foreign Application Priority Data

Aug. 11, 2010  (TW) .............................. 99126733 A

(51) Int. Cl.
 G06F 9/00 (2006.01)
 G06F 15/177 (2006.01)
 G06F 9/455 (2006.01)
 G06F 9/44 (2006.01)

(52) U.S. Cl.
 CPC .......... *G06F 9/45537* (2013.01); *G06F 9/4401* (2013.01)
 USPC ............................................................ 713/2

(58) Field of Classification Search
 CPC ........................... G06F 9/45537; G06F 9/4401
 USPC .......................................................... 713/2
 See application file for complete search history.

(56) References Cited

U.S. PATENT DOCUMENTS

| 7,337,445 B1* | 2/2008 | Price et al. ...................... 719/313 |
| 2006/0101259 A1* | 5/2006 | Chen ................................. 713/2 |
| 2007/0005661 A1* | 1/2007 | Yang ............................. 707/200 |
| 2010/0064156 A1* | 3/2010 | Duvalsaint et al. ........... 713/322 |
| 2010/0211769 A1* | 8/2010 | Shankar et al. .................... 713/2 |
| 2011/0016299 A1* | 1/2011 | Galicia et al. ..................... 713/1 |

FOREIGN PATENT DOCUMENTS

| TW | 200713058 | 4/2007 |
| TW | 201020804 | 6/2010 |

OTHER PUBLICATIONS

Office action mailed on Jun. 10, 2013 for the Taiwan application No. 099126733, filing date: Aug. 11, 2010, p. 1 line 14, p. 2-6 and p. 7 line 1-9.
Office action mailed on Jul. 3, 2013 for the China application No. 201010258591.4, p. 3 line 4-31, p. 4 and p. 5 line 1-19.
Huang Zhi, "Realization of Multiple Operating Systems and Virtual Network Based on VMware", Computer Knowledge and Technology, vol. 3, No. 9, Sep. 30, 2008, p. 2088 line 33-42.
Xiong Lin, "Analysis the Technology and the Application of the VMware", Computer Knowledge and Technology, Jul. 31, 2007, p. 429 left column line 35-47.
Office action mailed on Jan. 26, 2014 for the China application No. 201010258591.4, p. 3 line 5-31, p. 4 and p. 5 line 1-28.

* cited by examiner

*Primary Examiner* — Thomas Lee
*Assistant Examiner* — Robert Cassity
(74) *Attorney, Agent, or Firm* — Winston Hsu; Scott Margo

(57) ABSTRACT

An application method for integrating heterogeneous operating systems based on the same system kernel is disclosed. The application method includes opening a master virtual console corresponding to a master operating system, opening a slave virtual console corresponding to a slave operating system in the master virtual console, and establishing a share information area for the master operating system and the slave operating system and switching to slave virtual console to operate on the slave operating system.

8 Claims, 7 Drawing Sheets

METHOD FOR INTEGRATING HETEROGENEOUS OPERATING SYSTEMS BASED ON THE SAME SYSTEM KERNEL USING A SHARED INFORMATION AREA ACCESSIBLE TO MULTIPLE OPERATING SYSTEMS

BACKGROUND OF THE INVENTION

1. Field of the Invention

The invention relates to an application method for integrating heterogeneous operating systems based on the same system kernel, and more particularly, to a method for integrating applications of heterogeneous operating systems based on the same system kernel by using characteristics of virtual consoles.

2. Description of the Prior Art

Linux is an open source operating system for which the source code is freely available to everyone. Linux has advantages of stability, low software development cost, multi-user support, high security, etc., and therefore, is often adopted as a software development platform. Today, many operating systems, such as X Window, QT, and Android, are developed based on the Linux kernel. Please refer to FIG. 1 and FIG. 2. FIG. 1 is a boot process 10 of an operating system based on the Linux kernel according to prior art. FIG. 2 is a diagram of an operating environment of the operating system based on the Linux kernel according to prior art. In general, for an operating system based on the Linux kernel, the Linux kernel can be loaded at the beginning of a boot process of a computer system (Step 102). An initialization module, such as an initrd (also called initial ramdisk) file system, is loaded as needed for implementing the following hardware detection and configuration (Step 104). Furthermore, a root file system of the operating system is mounted and loaded (Step 106). After that, a virtual console corresponding to the operating system can be opened accordingly (Step 108). Finally, the required operating system services can be performed in the operating system (Step 110). In such a condition, a user is able to operate the operating system via the virtual console. As shown in FIG. 2, each virtual console has a corresponding root file system including program code and related resources of the corresponding operating system. Usually, the operating process of each operating system includes activating the Linux kernel at the bottom layer, and accomplishing the hardware configuration. Moreover, the corresponding root file system and virtual console can be utilized for running required applications of the operating system.

In general, each operating system has different types of development and design. For example, various operating systems may develop various types of application software. Even, a same kind of operating system may add some application software with an evolved revision. Therefore, as the user has some use requirements which are not able to be dealt with in the present operating system, the user may seek to resolve the requirements by using a specific application software of another operating system. However, if the user wants to use the specific application software of the other operating system, a reboot process is required and the process shown in FIG. 1 also needs to be performed to log into another operating system for implementing the specific application software. In other words, the user can only use functions of single operating system on a single hardware platform, causing inconvenience in use.

In short, how to apply application software or resources of each operating system across multiple operating systems simultaneously should be a concern in progressive system design.

SUMMARY OF THE INVENTION

It is therefore an objective of the invention to provide an application method for integrating heterogeneous operating systems based on the same system kernel.

The invention discloses an application method for integrating heterogeneous operating systems based on the same system kernel, comprising opening a master virtual console corresponding to a master operating system; opening a slave virtual console corresponding to a slave operating system in the master virtual console; and establishing a sharing information area for the master operating system and the slave operating system, and switching to the slave virtual console to operate on the slave operating system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
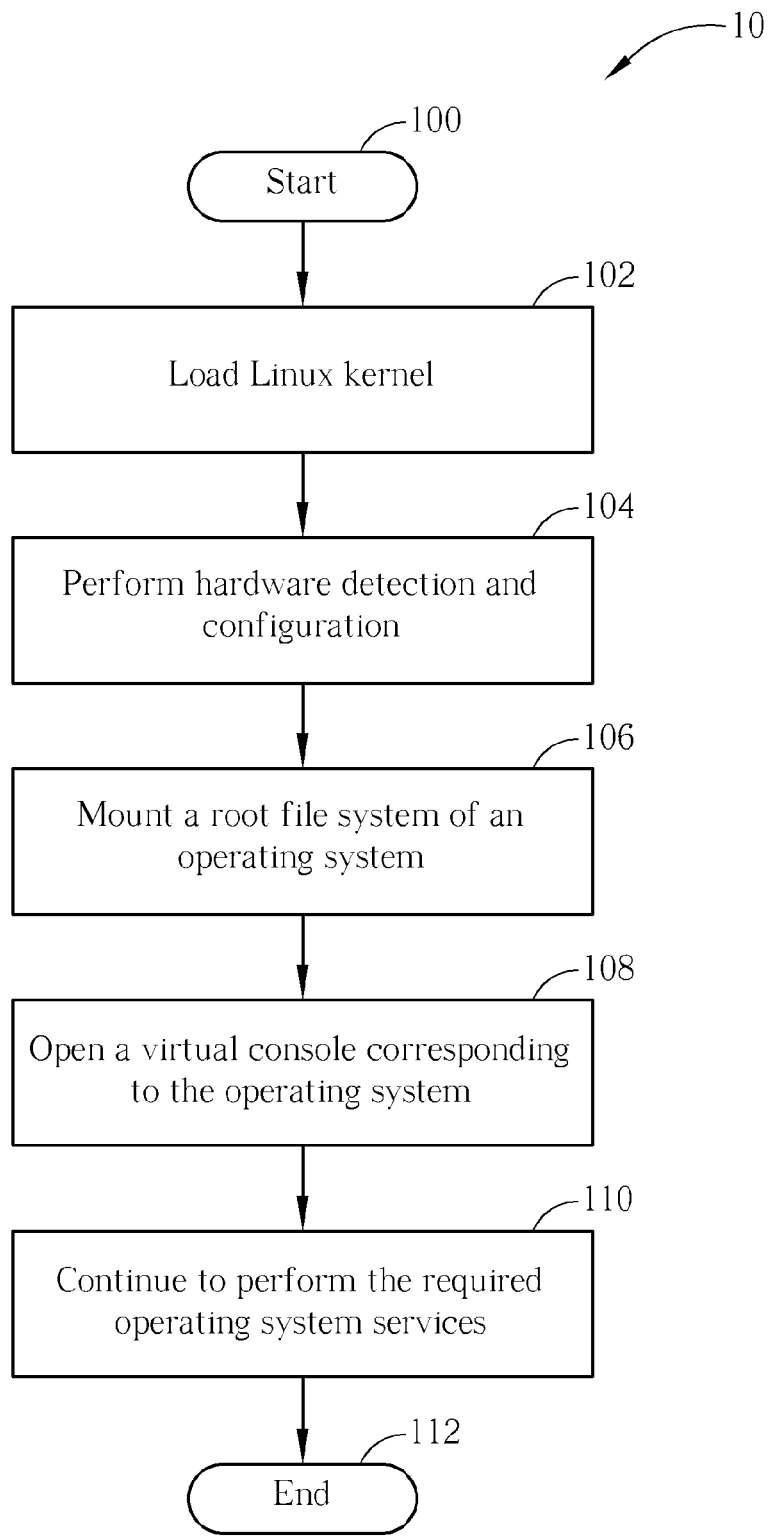
FIG. 1 is a boot process of an operating system based on Linux kernel according to prior art.
Figure 2:
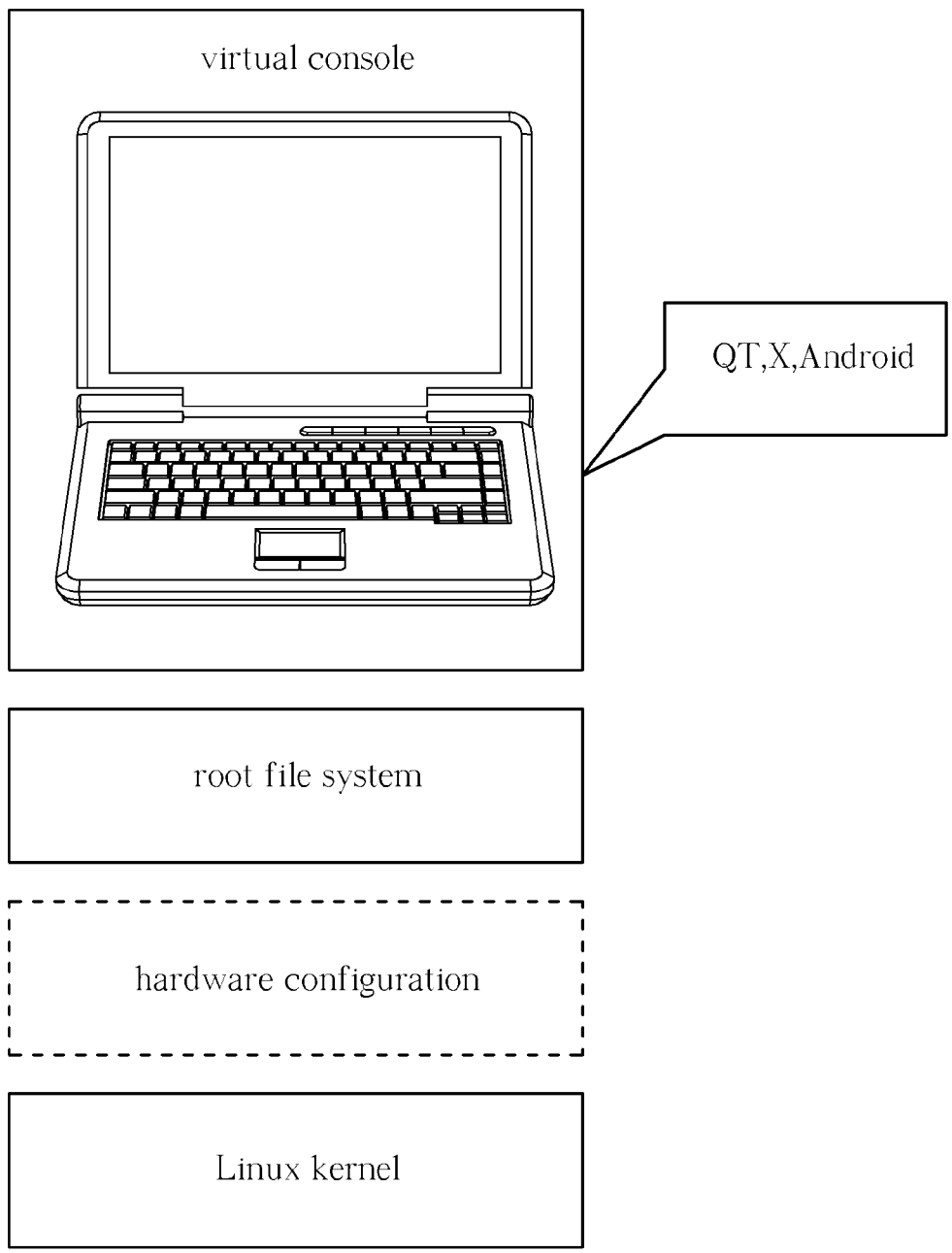
FIG. 2 is a schematic diagram of an operating environment of the operating system based on the Linux kernel according to prior art.
Figure 3:
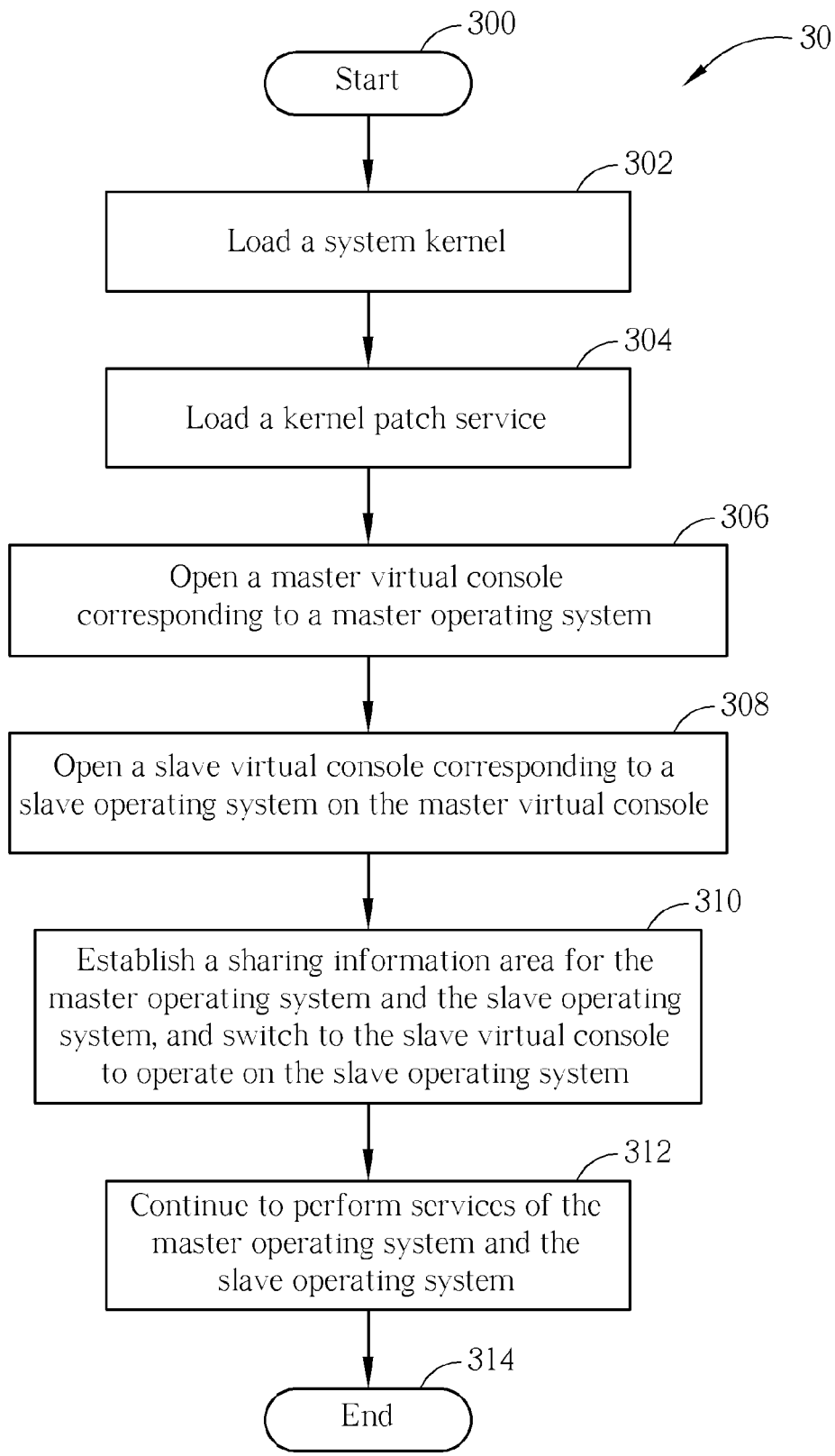
FIG. 3 is a schematic diagram of a process according to an embodiment of the invention.

To allow a user to use the required operating system resources belonging to various operating systems in the same hardware platform simultaneously, the invention provides a method for integrating applications of heterogeneous operating systems based on the same system kernel. Please refer to FIG. 3, which is a schematic diagram of a process 30 according to an embodiment of the invention. The process 30 is utilized for operating between a master operating system and a slave operating system simultaneously for the user to realize resource sharing for heterogeneous operating systems. Note that, both of the mentioned master operating system and slave operating system are developed from the same operating system kernel. Preferably, the mentioned master operating system and slave operating system are developed from the Linux operating system kernel, and this should not be a limitation of the invention. The process 30 includes the following steps:

Step 300: Start.

Step 302: Load a system kernel.

Step 304: Load a kernel patch service.

Step 306: Open a master virtual console corresponding to a master operating system.

Step 308: Open a slave virtual console corresponding to a slave operating system on the master virtual console Step 310: Establish a sharing information area for the master operating system and the slave operating system, and switch to the slave virtual console to operate on the slave operating system.

Step 312: Continue to perform services of the master operating system and the slave operating system.

Step 314: End

Further description associated with the process 30 follows. In Steps 302 and 304, the kernel patch service can be loaded after the system kernel has been loaded in a computer system. The kernel patch service can be utilized for addressing potential conflicts during loading the following slave operating system and also assisting with information exchange services between the master operating system and the slave operating system. In other words, the kernel patch service is capable of being used for dealing with differences in usage for the master operating system and the slave operating system. For example, a system network function is normal in the master operating system, and after switching to the slave operating system, the system network function may become abnormal in the slave operating system due to different network permissions required by the master operating system and the slave operating system. In such a condition, the kernel patch service can be utilized for solving conflicts between the master operating system and the slave operating system. On the other hand, in Step 302, a memory disk can be loaded and initialized. Preferably, the system kernel and the memory disk can be loaded and initialized by a boot loader.

Figure 4:
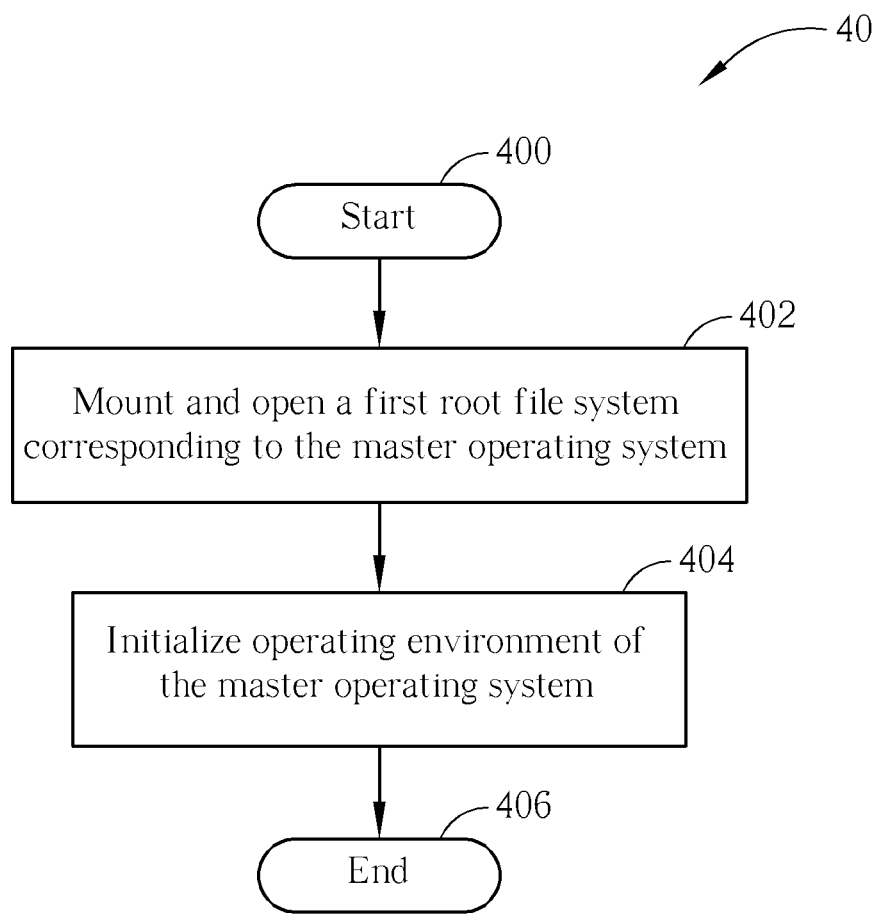
FIG. 4 is a schematic diagram of a start process of the master operating system according to an embodiment of the invention.

Furthermore, in Step 306, a master virtual console corresponding to the master operating system is opened so that a user can use the master virtual console to operate in the master operating system. For example, please refer to FIG. 4, which is a schematic diagram of a start process 40 of the master operating system according to an embodiment of the invention. First, a first root file system corresponding to the master operating system is mounted and opened (Step 402). After that, operating environment of the master operating system can be initialized (Step 404). In other words, the master virtual console corresponding to the master operating system can be activated through the start process 40 accordingly so that the user is able to operate in the master operating system via the master virtual console.

Figure 5:
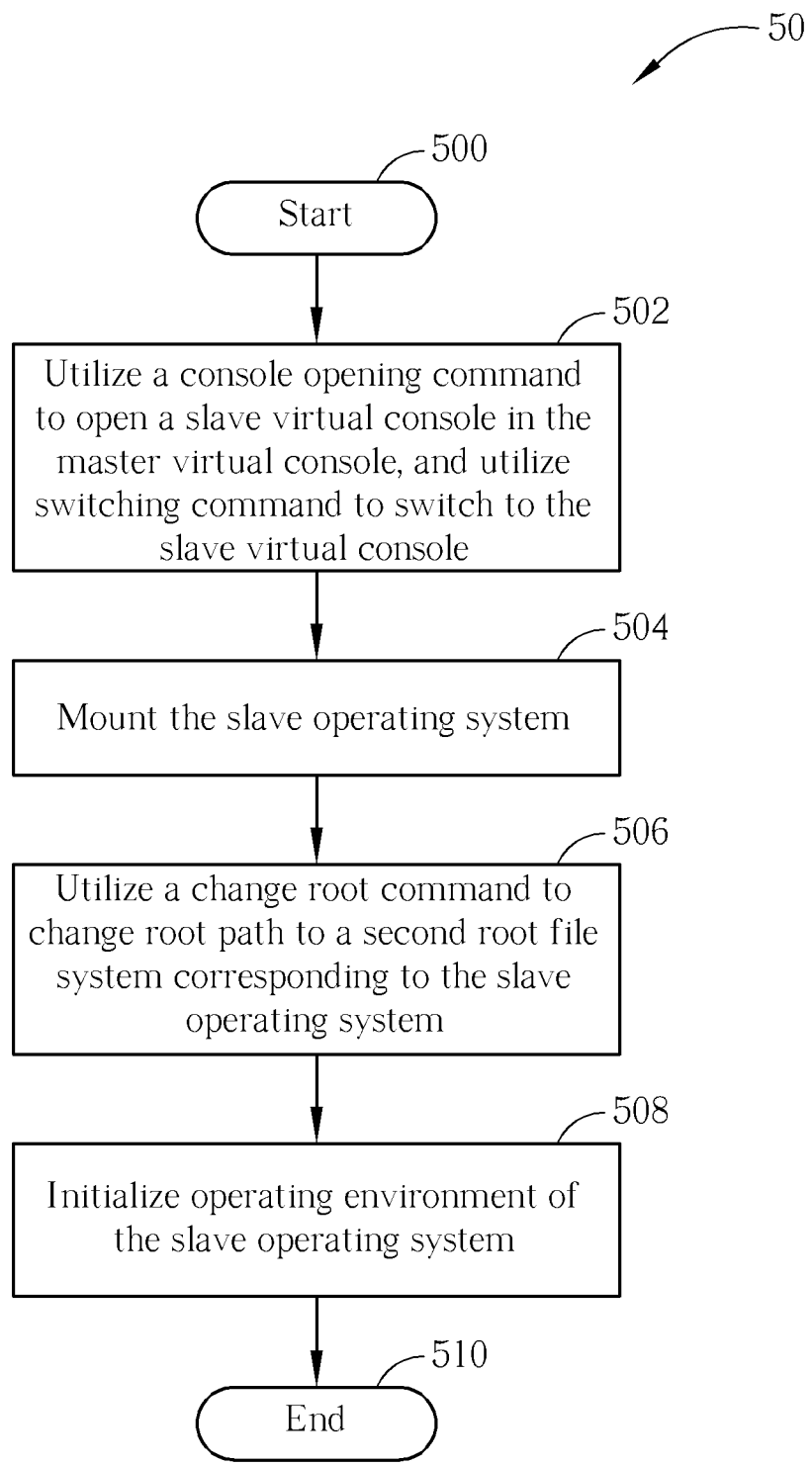
FIG. 5 is a schematic diagram of a start process of the slave operating system according to an embodiment of the invention.

In Step 308, the invention utilizes a property of virtual consoles to change control permissions of the computer system to the slave virtual console corresponding to the slave operating system. For example, a change root command is utilized for transforming the control permissions from the master virtual console to the slave virtual console. As a result, the invention can utilize the property of virtual consoles to switch to another root file system and perform other procedures in another file system on the same hardware and system kernel. Please refer to FIG. 5, which is a schematic diagram of a start process 50 of the slave operating system according to an embodiment of the invention. According to the start process 50, another virtual console is opened on the master virtual console (Step 502). For example, a console opening command, such as an "openvt" command, can be utilized for opening a slave virtual console, and a switching command, such as a "chvt" command, can be utilized for switching to the slave virtual console. Moreover, the slave operating system is mounted (Step 504) and a change root command, such as a "chroot" command, is executed for changing the root path to a second root file system corresponding to the slave operating system (Step 506). Finally, operating environment of the slave operating system is initialized (Step 506), and therefore, the user can operate on the slave operating system.

In brief, by using the characteristic of the virtual console, the invention utilizes the master virtual console to activate the slave virtual console when the master console has been opened. In other words, the slave operating system depends on the operating environment of the master operating system. As a result, the master operating system and the slave operating system can exist on the same computer system simultaneously for operation by the user. Therefore, the user can switch between the master operating system and the slave operating system according to requirements simultaneously. For example, in the prior art, when the user operates on the master operating system and wants to use certain application software of the slave operating system, the user needs to perform a reboot process to log in to the slave operating system for implementing the required application software. Comparatively, in the embodiment of the invention, the user is capable of switching to the slave operating system (by a switch process 60 mentioned in the following description) to run the required application software, simultaneously, without performing the reboot process.

Furthermore, in Step 310, as the user wants to switch from the master operating system to the slave operating system to implement the specific application software, the user can utilize a switch mechanism, such as a combination key or a gesture operation, for activating a switch requirement. After receiving the switch requirement, a specific background service of the invention can switch to the slave virtual console from the master virtual console with sharing information of the master operating system and the slave operating system to operate in the slave operating system and vice versa. Above-mentioned sharing information includes data capable of being shared mutually between the master operating system and the slave operating system, and availability of certain application software or a specific service, such as whether the application software or the specific service exists or is capable of being used or implemented.

Figure 6:
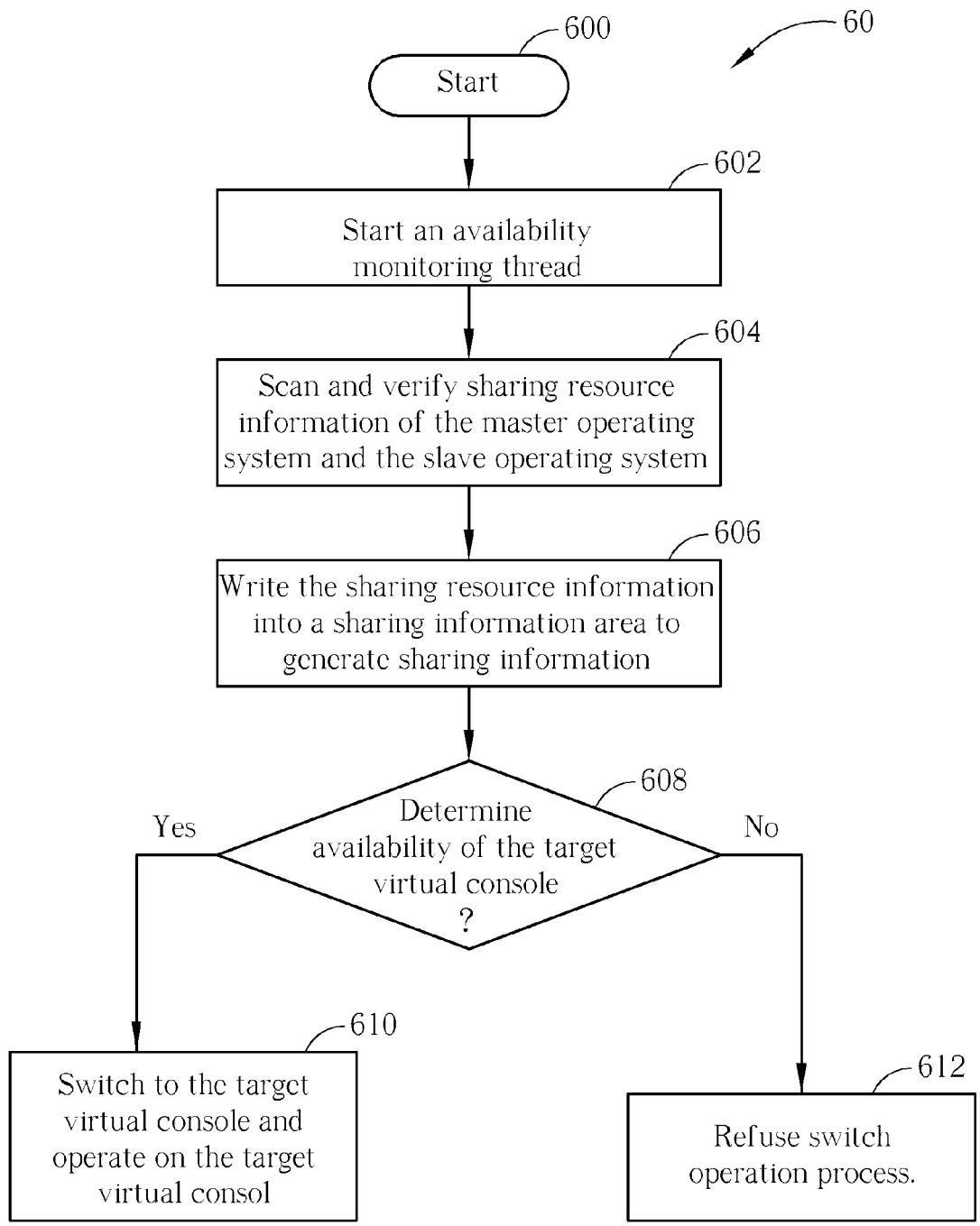
FIG. 6 is a schematic diagram of a switch process of the slave operating system according to an embodiment of the invention.

Therefore, in Step 310, whether the required application software or service of the target virtual console is capable of being used or implemented can be determined according to the sharing information. In other words, the sharing information can be regarded as a determination basis of switching the virtual console. For example, an availability monitoring thread can be utilized for monitoring the sharing information which is required in Step 310. Please refer to FIG. 6, which is a schematic diagram of a switch process 60 of the slave operating system according to an embodiment of the invention. First, an availability monitoring thread is started (Step 602). In such a condition, the availability monitoring thread begins to monitor the sharing resource in the master operating system and the slave operating system. This means the availability monitoring thread can be utilized for scanning and verifying in real-time whether the master operating system or the slave operating system contains any available application software or sharing data (Step 604). The monitored result (also called resource information) can be written into a sharing information area to generate sharing information (Step 606). In such a situation, the front-stage operating system is able to read the sharing information from the sharing information area and determine whether the operating system corresponding to the target virtual console, such as the slave virtual console, has the required application software or data (Step 608). If yes, go to Step 610 to switch to the target virtual console; otherwise, go to Step 612, in which the switch operation is refused and the user continues to operate on the present virtual console. For example, if the user operates on the master virtual console now and the slave virtual console has a required and available application software, by going to Step 610, the virtual console operated by the user is able to switch from the master virtual console to the slave virtual console to implement the specific application software in the slave operating system. Otherwise, go to Step 612.

Note that the above-mentioned processes are exemplary embodiments of the invention and details thereof should not be considered limiting on the scope of the invention. Those skilled in the art should observe that the processes shown in FIG. 3 to FIG. 6 can include other intermediate steps; part of steps of the above-mentioned processes can be omitted; or several steps of the processes can be merged into a single step for suitable modifications without departing from the spirit of the invention. Of course, if a roughly identical result can be obtained, the steps shown in FIG. 3 to FIG. 6 are not limited to being performed according to the order shown in FIG. 3 to FIG. 6. In addition, in the embodiment of the invention, only one master operating system and one slave operating system are taken for illustration, and this is not a limitation of the invention. For example, the invention is also capable of providing the user operation on multiple slave operating systems by opening multiple slave virtual consoles simultaneously.

Figure 7:
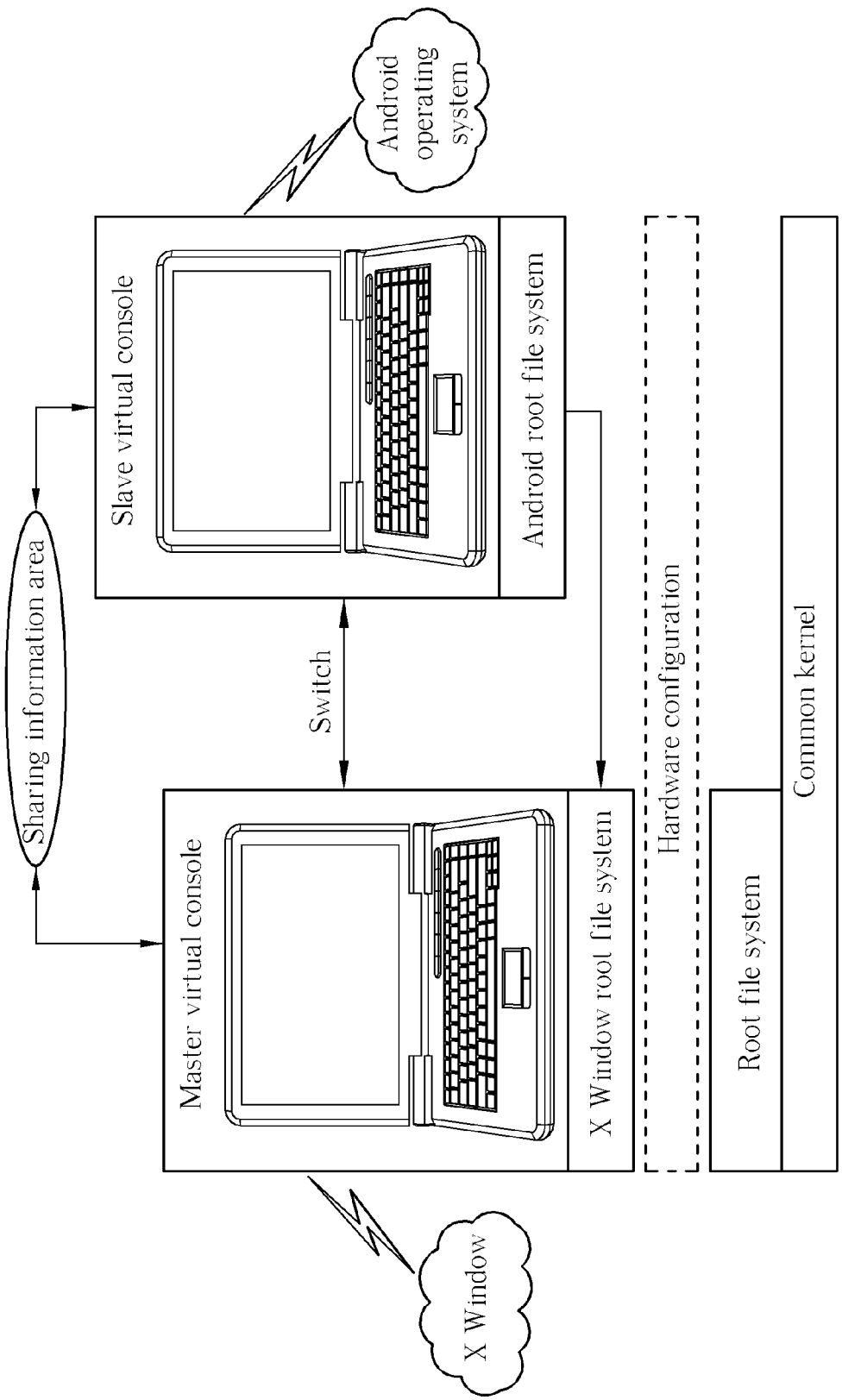
FIG. 7 is a schematic diagram of integrating application of heterogeneous operating systems according to an embodiment of the invention.

The following further elaborates the operation of the process 30. Please refer to FIG. 7, which is a schematic diagram of integrating application of heterogeneous operating systems according to an embodiment of the invention. Taking an X Window as the master operating system and an Android operating system as the slave operating system for illustration, the system kernel of the X Window and the Android operating system are both developed from the Linux system kernel. In other words, the X Window and the Android operating system share a common Linux kernel. First, through Step 302 and Step 304, the common system kernel and the kernel patch service are loaded in the computer system. Furthermore, a master virtual console corresponding to the X Window is opened. After the master virtual console has been opened, an "openvt" command can be used for opening the slave virtual console corresponding to the Android operating system (Step 308) and a "chvt" command can be used for switching to the slave virtual console. In such a situation, the master virtual console corresponding to the X Window and the slave virtual console corresponding to the Android operating system exist on the same computer system simultaneously, and the Android operating system depends on the operating environment of the X Window. Moreover, an availability monitoring thread can be used for monitoring available sharing resource of the X Window and the Android operating system. If the user is operating the X Window on the master virtual console and wants to use certain online game application software of the Android operating system for playing an online game, before switching to the slave operating system, the availability monitoring thread can be utilized to check whether the application software is able to be used, i.e. whether the application software exists in the Android operating system or not, whether user permissions are available or not, etc. When all conditions are confirmed, the switching operation (from the master virtual console to the slave virtual console) is then achieved. The user is able to implement the required online game application software of the Android operating system. In addition, after switching to the slave virtual console, the kernel patch service can be used for modifying differences of usage between the master operating system and the slave operating system to implement the software of the heterogeneous operating system successfully.

In summary, compared with the prior art, the invention is capable of applying various operating system environments simultaneously, and using resources of other operating systems without performing a reboot process to log into other operating systems. The invention can offer the user real-time application and integration of related application software and data of heterogeneous operating systems based on the same system kernel on a single computer hardware. The invention utilizes a property of a virtual console to open multiple virtual consoles for realizing multiple operating systems coexisting on the same hardware platform, and also perform the switch operation to switch to the corresponding operating system immediately through a switch process of the virtual console to apply application software and resources of each operating system for realizing resource sharing of the integrating heterogeneous operating systems.

Those skilled in the art will readily observe that numerous modifications and alterations of the device and method may be made while retaining the teachings of the invention.

What is claimed is:

1. An application method for integrating heterogeneous operating systems based on the same system kernel, comprising:
   opening a master virtual console corresponding to a master operating system;
   opening a slave virtual console corresponding to a slave operating system on the master virtual console; and
   establishing a sharing information area for the master operating system and the slave operating system, and switching to the slave virtual console to operate on the slave operating system, comprising:
   starting an availability monitoring thread for scanning and verifying whether or not the master operating system and the slave operating system contain any available application software or sharing data;
   writing the verified result into the sharing information area to generate sharing information;
   reading the sharing information from the sharing information area and determining whether the slave operating system has a required application software or data accordingly; and
   switching to the slave virtual console to operate on the slave operating system when the slave operating system has the required application software or data.

2. The application method of claim 1, wherein before the step of opening the master virtual console corresponding to the master operating system, the application method further comprises:
   loading a system kernel; and
   loading a kernel patch service.

3. The application method of claim 2, wherein the step of loading the system kernel further comprises loading and initializing a memory disk.

4. The application method of claim 3, wherein a boot loader is utilized for loading and initializing the system kernel and the memory disk.

5. The application method of claim 2, wherein the step of opening the master virtual console corresponding to the master operating system comprises:
   mounting and opening a first root file system corresponding to the master operating system; and
   initializing operating environment of the master operating system.

6. The application method of claim 2, wherein the step of opening the slave virtual console corresponding to the slave operating system in the master virtual console comprises:

utilizing a console opening command to open the slave virtual console in the master virtual console and utilizing a switching command to switch to the slave virtual console;

mounting the slave operating system;

executing a change root command to change a root path to a second root file system of the slave operating system; and initializing operating environment of the slave operating system.

7. The application method of claim 1, wherein the step of reading the sharing information from the sharing information area comprises reading the sharing information and refusing to switch to the slave virtual console when the sharing information indicates that the slave operating system does not have available application software.

8. The application method of claim 2, wherein the master operating system and the slave operating system are based on the same system kernel.

* * * * *